US007249186B1

(12) United States Patent
Sitaraman et al.

(10) Patent No.: US 7,249,186 B1
(45) Date of Patent: Jul. 24, 2007

(54) SYSTEM AND METHOD FOR IDENTIFYING A SUBSCRIBER FOR CONNECTION TO A COMMUNICATION NETWORK

(75) Inventors: Aravind Sitaraman, Santa Clara, CA (US); Aziz Abdul, Newark, CA (US); Bernard R. James, Mountain View, CA (US); Dennis J. Cox, Austin, TX (US); John A. Joyce, Nashua, NH (US); Peter S. Heitman, Milton, MA (US); Shujin Zhang, San Carlos, CA (US); Rene T. Tio, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/488,394

(22) Filed: Jan. 20, 2000

(51) Int. Cl.
*G06F 15/16* (2006.01)

(52) U.S. Cl. .................. 709/229; 370/235; 370/241.1; 370/399

(58) Field of Classification Search ................ 370/236, 370/395, 40, 229, 397, 391, 278, 468, 394, 370/399, 354, 427, 259, 467, 230, 231, 401, 370/352, 360, 386, 465, 254; 709/227, 241, 709/200, 238, 243; 714/6; 713/1, 201; 704/228; 270/241, 399, 235; 726/11
See application file for complete search history.

(56) References Cited

U.S. PATENT DOCUMENTS 4,896,319 A * 1/1990 Lidinsky et al. ............ 370/427
5,115,427 A * 5/1992 Johnson, Jr. et al. ....... 370/391
5,239,537 A * 8/1993 Sakauchi .................... 370/218
5,274,643 A 12/1993 Fisk .......................... 370/94.1
5,406,643 A * 4/1995 Burke et al. ................ 709/243
5,430,715 A 7/1995 Corbalis et al. .............. 370/54
5,461,624 A 10/1995 Mazzola .................. 370/85.13
5,510,777 A * 4/1996 Pilc et al. .................. 340/5.27

(Continued)

FOREIGN PATENT DOCUMENTS

WO WO 99/23852 5/1999

OTHER PUBLICATIONS

Christoph L. Schuba, et al., "Countering Abuse of Name-Based Authentication," *COAST Laboratory, Department of Computer sciences, Purdue University*, date unknown, 21 pages.

(Continued)

*Primary Examiner*—Nathan J. Flynn
*Assistant Examiner*—Dustin Nguyen
(74) *Attorney, Agent, or Firm*—Baker Botts L.L.P.

(57) ABSTRACT

A system for identifying a subscriber includes an access server coupled to a number of subscribers using a first communication network and further coupled to a second communication network, a memory coupled to the access server, and a processor coupled to the memory. The access server receives a communication from a particular subscriber using a particular one of a number of virtual circuits associated with the first communication network. The memory stores path information that identifies a virtual circuit assigned to the particular subscriber. The processor identifies the particular subscriber for connection to the second communication network based upon the path information and the particular virtual circuit used to receive the communication from the particular subscriber.

39 Claims, 4 Drawing Sheets

U.S. PATENT DOCUMENTS

| | | | | | |
|---|---|---|---|---|---|
| 5,539,884 | A | * | 7/1996 | Robrock, II | 709/227 |
| 5,555,244 | A | | 9/1996 | Gupta et al. | 370/60.1 |
| 5,588,003 | A | * | 12/1996 | Ohba et al. | 370/468 |
| 5,617,417 | A | * | 4/1997 | Sathe et al. | 370/394 |
| 5,649,108 | A | * | 7/1997 | Spiegel et al. | 709/241 |
| 5,673,265 | A | | 9/1997 | Gupta et al. | 370/432 |
| 5,740,171 | A | | 4/1998 | Mazzola et al. | 370/392 |
| 5,740,176 | A | | 4/1998 | Gupta et al. | 370/440 |
| 5,742,604 | A | | 4/1998 | Edsall et al. | 370/401 |
| 5,764,636 | A | | 6/1998 | Edsall | 370/401 |
| 5,796,732 | A | | 8/1998 | Mazzola et al. | 370/362 |
| 5,864,537 | A | * | 1/1999 | Hijikata et al. | 370/235 |
| 5,864,542 | A | | 1/1999 | Gupta et al. | 370/257 |
| 5,968,176 | A | * | 10/1999 | Nessett et al. | 726/11 |
| 5,974,045 | A | * | 10/1999 | Ohkura et al. | 370/241.1 |
| 5,999,514 | A | * | 12/1999 | Kato | 370/231 |
| 5,999,518 | A | * | 12/1999 | Nattkemper et al. | 370/258 |
| 6,023,474 | A | * | 2/2000 | Gardner et al. | 370/467 |
| 6,061,650 | A | * | 5/2000 | Malkin et al. | 704/228 |
| 6,069,895 | A | * | 5/2000 | Ayandeh | 370/399 |
| 6,081,518 | A | | 6/2000 | Bowman-Amuah | 370/352 |
| 6,084,892 | A | * | 7/2000 | Benash et al. | 370/401 |
| 6,108,708 | A | * | 8/2000 | Iwata | 709/238 |
| 6,111,882 | A | * | 8/2000 | Yamamoto | 370/399 |
| 6,252,878 | B1 | * | 6/2001 | Locklear, Jr. et al. | 370/401 |
| 6,298,043 | B1 | | 10/2001 | Mauger et al. | 370/248 |
| 6,396,838 | B1 | * | 5/2002 | Palnati | 370/395 |
| 6,415,313 | B1 | * | 7/2002 | Yamada et al. | 709/200 |
| 6,430,152 | B1 | | 8/2002 | Jones et al. | 370/229 |
| 6,446,200 | B1 | * | 9/2002 | Ball et al. | 713/1 |
| 6,456,623 | B1 | * | 9/2002 | Kobayasi et al. | 370/395.1 |
| 6,498,845 | B1 | | 12/2002 | Martz et al. | 379/230 |
| 6,504,844 | B1 | * | 1/2003 | Keller-Tuberg | 370/397 |
| 6,597,689 | B1 | * | 7/2003 | Chiu et al. | 370/354 |
| 6,615,358 | B1 | * | 9/2003 | Dowd et al. | 713/201 |
| 6,628,649 | B1 | * | 9/2003 | Raj et al. | 370/360 |
| 6,636,505 | B1 | * | 10/2003 | Wang et al. | 370/352 |
| 6,665,305 | B1 | * | 12/2003 | Weismann | 370/401 |
| 6,785,228 | B1 | * | 8/2004 | Vandette et al. | 370/230 |
| 6,788,649 | B1 | * | 9/2004 | Dugan et al. | 370/254 |
| 6,788,703 | B2 | * | 9/2004 | Tran | 370/465 |
| 6,804,229 | B2 | * | 10/2004 | Landaveri et al. | 370/386 |
| 6,885,661 | B1 | * | 4/2005 | Hopper et al. | 370/354 |

OTHER PUBLICATIONS

Safford, et al., "Secure RPC Authentication (SRA) for TELNET and FTP," *Supercomputer Center, Texas A& M University*, 1993, 5 pages.

David Allan, semi-Permanent PPP Connections ($sP^4$) ADSL Forum 00-008, *Nortel Networks*, Feb. 8-11, 2000 (distributed to ADSL Forum members Jan. 14, 2000), 5 pages.

Christoph L. Schuba and Eugene H. Sapfford. Countering abuse of name-based authentification. Technical Report CSD--TR--94--029, COAST Laboratory, Purdue University, Apr. 1994.

David R. Safford, David K. Hess, and Douglas Lee Schales. "*Secure RPC Authentication (SRA) for TELNET and FTP*". In The Fourth USENIX Security Symposium, Santa Clara, California, pp. 63--67, Oct. 1993.

* cited by examiner

58

| PATH INFORMATION 60 | | | | SUBSCRIBER INFORMATION 62 | |
|---|---|---|---|---|---|
| 110 VIRTUAL CIRCUIT INFORMATION | 112 INTERFACE INFORMATION | 114 ACCESS SERVER INFORMATION | 116 USER INFORMATION | 118 ADDRESS INFORMATION | 120 CONFIGURATION INFORMATION |
| 321.00707 | slot=1000 module=0 port=000 | 172.16.2.1 | CBT@@/ CBT@@ | 172.18.1.0 | config1.file |
| 0/343 | slot=1000 module=0 port=001 | 172.16.2.1 | CBT2@@/ CBT2@@ | 172.18.1.1-172.18.1.7 | firmware. update |
| ⋮ | ⋮ | ⋮ | ⋮ | ⋮ | ⋮ |
| 98.09081 | slot=0100 module=1 port=000 | 127.47.36.1 | JERRY * * * * * | 194.16.2.0 | config2.file |

| 130 SESSION INFORMATION | 132 ADDRESS INFORMATION | 134 MAPPING INFORMATION | 136 ADDRESS INFORMATION | 138 ROUTING INFORMATION |
|---|---|---|---|---|
| 1 | 172.18.1.0 | 1 → 3 | www.cisco.com | - |
| 2 | 194.16.2.0 | 2 → 1 | joe@net | {node 1} |
| ⋮ | ⋮ | ⋮ | ⋮ | ⋮ |
| n | 172.17.1.1 | 4 → 2 | 124.90.1.0 | {node 3} |

*FIG. 4*

SYSTEM AND METHOD FOR IDENTIFYING A SUBSCRIBER FOR CONNECTION TO A COMMUNICATION NETWORK

CROSS-REFERENCE TO RELATED APPLICATIONS

This application is related to and filed concurrently with pending U.S. patent application Ser. No. 09/488,395, entitled "System and Method for Determining Subscriber Information." These applications have been commonly assigned to Cisco Technology, Inc.

TECHNICAL FIELD OF THE INVENTION

This invention relates in general to data communication, and more particularly to a system for identifying a subscriber for connection to a communication network.

BACKGROUND OF THE INVENTION

Communication systems support the provisioning of voice, data, multimedia or other services and information to subscribers. A problem with prior communication systems is that a particular subscriber may pirate the services of another subscriber in the system without properly subscribing for the services. One solution to this problem is to assign a unique user name and password to the subscribers and to restrict access to particular services based upon a successful response to a query for a subscriber's user name and password. This solution is ineffective, however, when one subscriber assumes the identity of another subscriber by misappropriating the user name and password of the other subscriber and, thereby, obtains access to the other subscriber's services.

SUMMARY OF THE INVENTION

In accordance with the present invention, the disadvantages and problems associated with prior communication systems have been substantially reduced or eliminated.

In accordance with one embodiment of the present invention, a system for identifying a subscriber includes an access server coupled to a number of subscribers using a first communication network and further coupled to a second communication network, a memory coupled to the access server, and a processor coupled to the memory. The access server receives a communication from a particular subscriber using a particular one of a number of virtual circuits associated with the first communication network. The memory stores path information that identifies a virtual circuit assigned to the particular subscriber. The processor identifies the particular subscriber for connection to the second communication network based upon the path information and the particular virtual circuit used to receive the communication from the particular subscriber.

Another embodiment of the present invention is a method for identifying a subscriber that includes receiving a communication from a particular one of a number of subscribers using a particular one of a number of virtual circuits associated with a first communication network. The method continues by storing path information that identifies a virtual circuit assigned to the particular subscriber. The method concludes by identifying the particular subscriber for connection to a second communication network based upon the path information and the particular virtual circuit used to receive the communication from the particular subscriber.

Yet another embodiment of the present invention is an information server that includes a memory and a processor. The memory stores path information for a number of subscribers coupled to an access server using a number of virtual circuits associated with a first communication network. The path information identifies a virtual circuit assigned to a particular subscriber. The processor identifies the particular subscriber for connection to a second communication network based upon the path information and a particular virtual circuit that couples the particular subscriber to the access server.

Still another embodiment of the present invention is an access server that includes an interface coupled to a number of subscribers using a first communication network, a controller coupled to the interface, and a route processor coupled to the controller. The interface receives a communication from a particular subscriber using a particular one of a number of virtual circuits associated with the first communication network. The controller communicates a request to an information server for identifying the particular subscriber. The identification request identifies the particular virtual circuit used to receive the communication from the particular subscriber. The route processor supports a communication session between the particular subscriber and a second communication network in response to identifying the particular subscriber.

Technical advantages of the present invention include a system that identifies subscribers and determines subscriber information based, in part, upon path information and the particular virtual circuit used to receive a communication from a particular subscriber. Whereas in prior communication systems a particular subscriber may pirate the services of another subscriber by misappropriating the other subscriber's user name and password, the present invention provides services based upon "trusted" information which is generally not discoverable by another subscriber. Such "trusted" information includes, for example, path information and information identifying the particular virtual circuit actually used to receive a communication from a particular subscriber. In this respect, subscribers of the present invention cannot access services and information designated for other subscribers. Therefore, the identification techniques of the present invention provide integrity to the communication system.

Other technical advantages are readily apparent to one skilled in the art from the following figures, descriptions and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIG. 3 illustrates one embodiment of an identification table used by the system;

FIG. 4 illustrates one embodiment of a routing table used by the system.

DETAILED DESCRIPTION OF THE INVENTION

Figure 1:
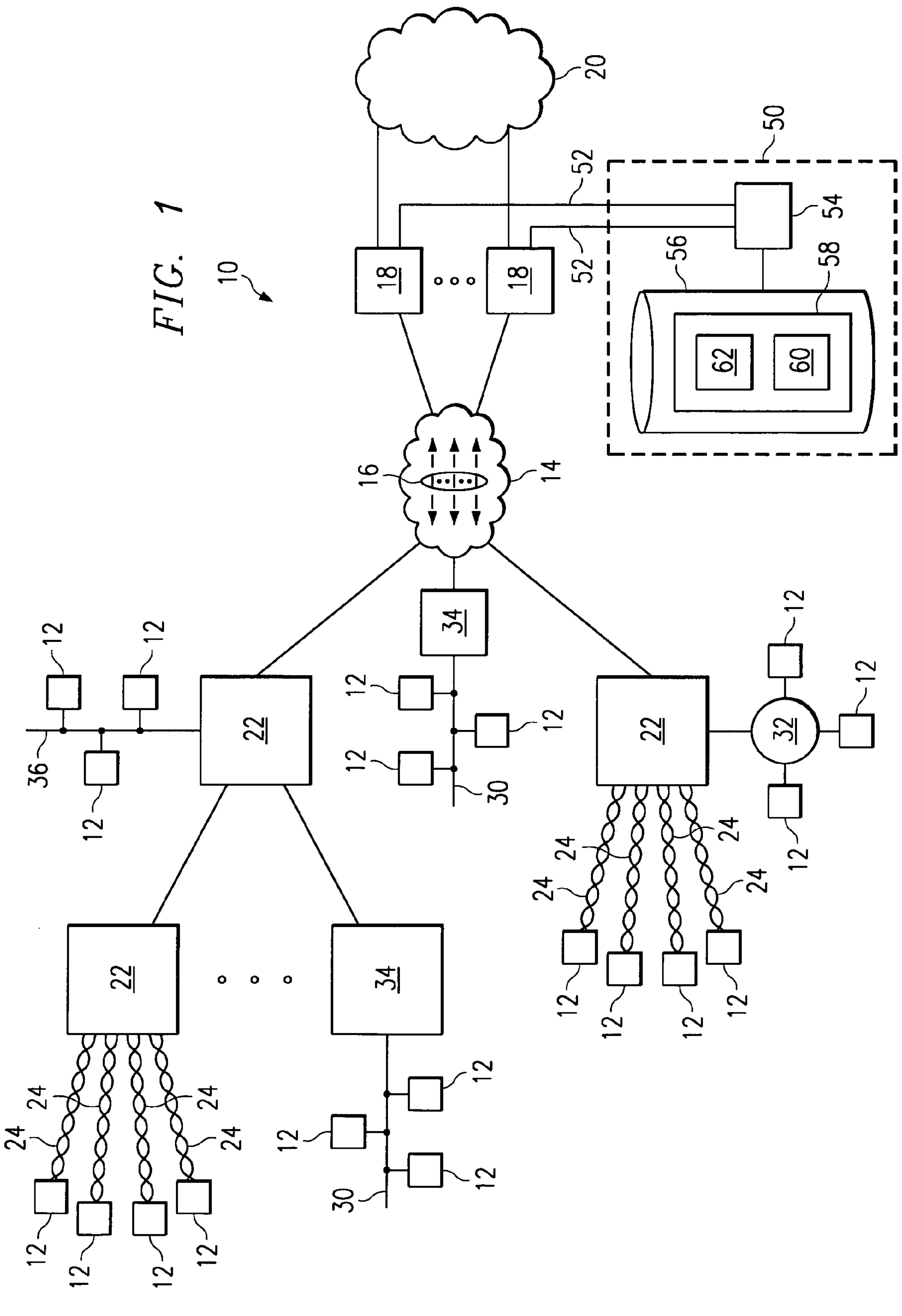
FIG. 1 illustrates a communication system according to the present invention.

FIG. 1 illustrates a communication system 10 that includes subscribers 12 coupled to access servers 18 using a first communication network 14. In general, access servers 18 initiate the identification of a subscriber 12 and, in response, communicate information to the subscriber 12 and/or grant the subscriber 12 access to a second communication network 20.

Subscribers 12 comprise any suitable number and combination of communication devices, such as customer premises equipment, that employ any appropriate communication techniques to communicate with access server 18 using communication network 14. In one embodiment, subscribers 12 couple to a communication server 22 in the local loop using traditional twisted pair subscriber lines 24. Subscribers 12 and communication server 22 exchange information using high bandwidth digital subscriber line technology, referred to generally as XDSL. Communication server 22 may reside at a central office, remote terminal, or other access point in communication system 10 that allows coupling to local loops formed by twisted pair subscriber lines 24.

Subscribers 12 may also be associated with a local area network (LAN), such as an Ethernet network 30, a token ring network 32, a fiber distributed data interface (FDDI) network, an asynchronous transfer mode (ATM) network 36, or any other association or arrangement of subscribers 12 in a network environment (referred to generally as LAN 30). LAN 30 supports Ethernet (10 Mbps), Fast Ethernet (100 Mbps), Gigabit Ethernet, switched Ethernet, or any other suitable networking protocol or technology. LAN 30 couples to communication network 14 using communication server 22, network interface 34, or any combination of communication server 22 and network interface 34. In one embodiment, network interface 34 comprises hubs, routers, bridges, gateways, and other suitable communication devices and related software that support suitable communication protocols to couple LAN 30 to communication network 14.

Communication network 14 comprises a plurality of virtual circuits 16 that support communication between communication server 22, network interface 34, and access server 18; In a particular embodiment, communication network 14 is part of a wide area network (WAN) that supports a suitable communication technology, such as ATM, frame relay, X.25 packet switching, statistical multiplexers, switched multi-megabit data service (SMDS), high-level data link control (HDLC), serial line Internet protocol (SLIP), point-to-point protocol (PPP), transmission control protocol/Internet Protocol (TCP/IP) or any other suitable WAN protocol or technology. Although the discussion below focuses on a particular ATM embodiment of communication network 14, communication system 10 contemplates any suitable WAN protocol or technology.

Access server 18 comprises any number and combination of interfaces, switches, routers, or any other suitable communication devices and related software that terminates a preassigned virtual circuit 16 for each subscriber 12. Access server 18 is described in greater detail with respect to FIG. 2. Access server 18 is coupled to an information server 50 using a link 52.

Communication network 20 comprises any combination of local area networks (LANs), wide area networks (WANs), global computer networks, hubs, routers, bridges, gateways, switches, servers, databases, or any other association of suitable wireline or wireless communication devices and networks, and related software, that provides subscribers 12 access to voice, data, multimedia, or other services and/or information.

A service provider associated with communication network 20, such as an Internet Service Provider (ISP), may employ one or more access servers 18 to restrict access to network 20 based upon the proper identification of subscribers 12. Access servers 18 may further be used to restrict access to information based upon the proper identification of subscribers 12. In general, system 10 assigns to each subscriber 12 a unique virtual circuit 16 that is to be used by the subscriber 12 to communicate with access server 18. When an access server 18 receives a communication from a particular subscriber 12, information server 50 identifies the subscriber 12 based, in part, upon the virtual circuit 16 assigned to the subscriber 12 and the virtual circuit 16 actually used to receive the communication from the subscriber 12.

Each virtual circuit 16 comprises a communication path between a particular subscriber 12 and an access server 18 that supports the appropriate communication technology of communication network 14. Although the following description of the present invention is detailed with respect to virtual circuits 16 in an ATM networking environment, it should be understood that a virtual circuit 16 assigned to a subscriber 12 in system 10 may be defined in any suitable networking environment using any suitable communication technologies and protocols, without deviating from the scope of the present invention.

A virtual circuit 16 in an ATM networking environment comprises a series of virtual path identifiers (VPI) and virtual channel identifiers (VCI). Together, a VPI and a VCI identify the next destination of an ATM cell as it passes through a series of communication devices in network 14 and terminates in access server 18. A unique virtual circuit 16 can therefore be assigned to each subscriber 12 by storing predetermined virtual circuit information, such as VPI and VCI information defining the virtual circuit 16, in communication server 22, network interface 34, and the communication devices associated with network 14 and access server 18.

Specific virtual circuit information defining some portion of a virtual circuit 16, such as the portion of the virtual circuit 16 coupled to communication server 22 and/or communication server 34 or the portion of the virtual circuit 16 coupled to access server 18, may be used to identify uniquely the entire virtual circuit 16 to the other components of system 10, and is generally referred to as a "virtual circuit identifier." Therefore, for example, the virtual circuit identifier of a particular virtual circuit 16 may be defined using the VPI and VCI information for that portion of the virtual circuit 16 terminating in access server 18.

Information server 50 comprises a processor 54 coupled to a memory 56. Processor 54 may comprise a central processing unit associated with a computer system, such as a mainframe, a workstation, or any other suitable general purpose data processing facility. Memory 56 comprises any suitable volatile or non-volatile memory device associated with processor 54. Memory 56 generally stores a number of files, lists, tables, or any other arrangement of information that supports the identification of subscribers 12 in system 10. For example, memory 56 includes identification table 58 having path information 60 and subscriber information 62 for subscribers 12 in system 10. Path information 60 comprises virtual circuit information used to identify the unique virtual circuits 16 assigned to subscribers 12 (e.g., virtual circuit identifiers), access server information, interface information, user information, and/or any other type of information used to identify subscribers 12. Subscriber information 62 comprises address information, configuration information, and/or any other suitable information used to upgrade, monitor, modify, or otherwise operate subscribers 12.

The components and information stored in information server 50 may be arranged integral to or remote from access server 18. Furthermore, information server 50 may comprise any combination of processors 54 and memory 56 to form any number of separate information servers 50 that may each be accessed by access server 18 using appropriate communication protocols. For example, information server 50 may comprise any number and combination of information servers 50 that may be accessed using a RADIUS protocol, a Trivial File Transfer Protocol ("TFTP"), a Dynamic Host Configuration Protocol ("DHCP"), or any suitable communication protocol.

In operation, access server 18 supports the provisioning of services to subscribers 12 in system 10. In particular, access server 18 receives a communication from a particular subscriber 12 using a particular one of the virtual circuits 16 associated with communication network 14. The communication issued by subscriber 12 may comprise the initiation of a point-to-point protocol session, a TFTP broadcast message, or any suitable request for services. In one example, a subscriber 12 requests connectivity to communication network 20. In another example, a subscriber 12 requests subscriber information 62. Prior to granting the subscriber 12 access to network 20 or communicating subscriber information 62 to the subscriber 12, access server 18 and/or information server 50 identify subscriber 12 based, in part, upon path information 60 associated with the particular subscriber 12 and the particular virtual circuit 16 actually used by the access server 18 to receive the communication from the particular subscriber 12.

A problem with prior communication systems is that a particular subscriber 12 may assume the identity of another subscriber 12, such as by using a misappropriated user name and password, and thereby pirate the services of the other subscriber 12. A particular advantage of the present invention is that path information 60 for a particular subscriber 12 is information that is generally not discoverable by another subscriber 12 and, therefore, is not easily misappropriated by other subscribers 12. System 10, therefore, overcomes the disadvantages of prior communication systems by identifying a particular subscriber 12 based, in part, upon path information 60 and the particular virtual circuit 16 used by access server 18 to receive a communication from the particular subscriber 12. Accordingly, system 10 identifies subscribers 12 to support provisioning the proper services to the proper subscribers 12.

Figure 2:
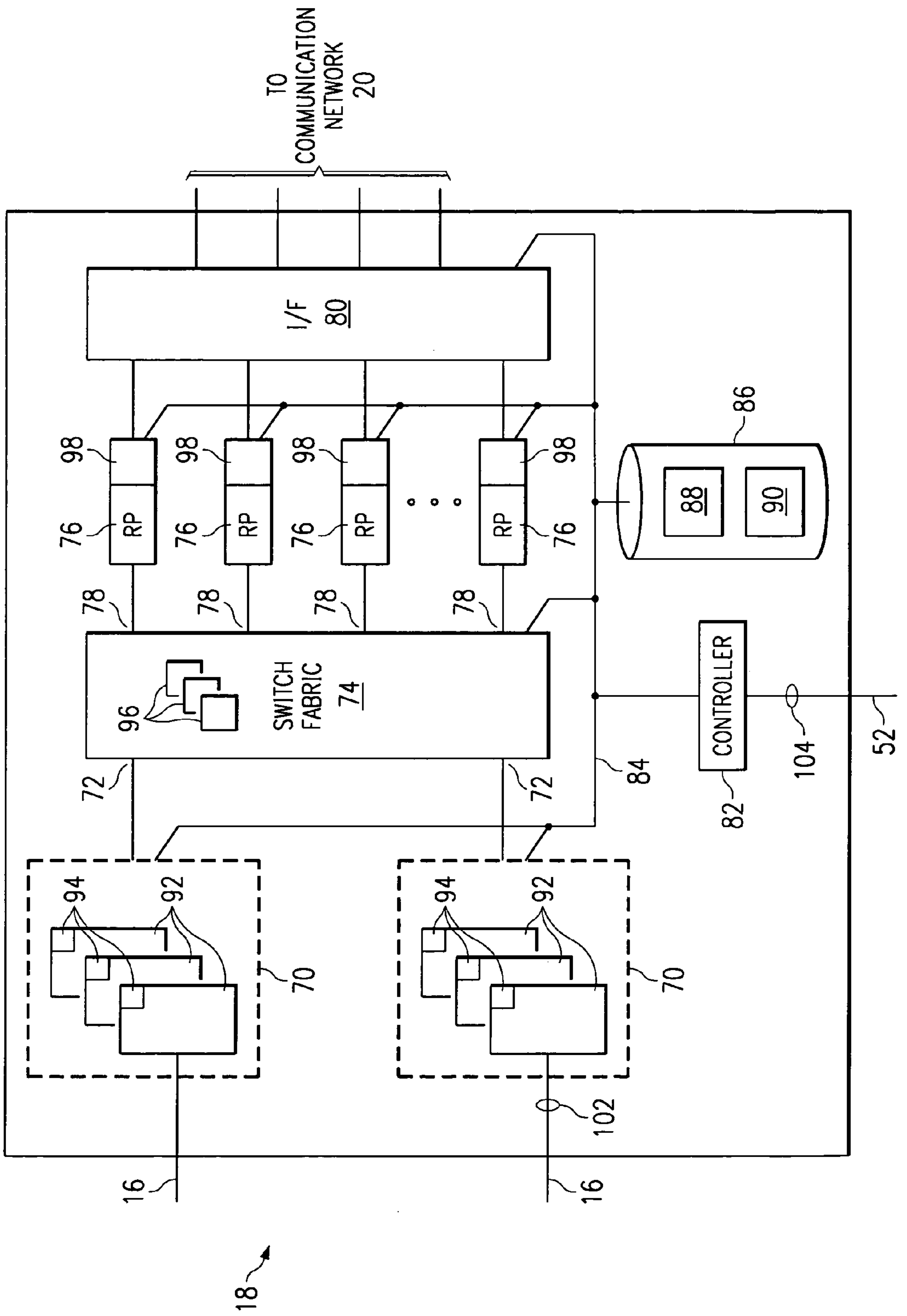
FIG. 2 illustrates one embodiment of an access server used by the system.

FIG. 2 illustrates access server 18 in more detail. Virtual circuits 16 of communication network 14 couple to one or more interfaces 70. Each interface 70 couples to an associated first port 72 of a switch fabric 74. A number of route processors 76 couple to second ports 78 of switch fabric 74. Route processors 76 also couple to interface 80, which in turn couples to communication network 20. In a particular embodiment, interfaces 70, switch fabric 74, route processors 76, and interface 80 reside in a single housing, rack mount, or other arrangement of integrated or separate components at a single location in communication system 10.

A controller 82, manages the overall operation of access server 18. Controller 82 communicates information with components of access server 18 using bus 84. A memory 86 coupled to controller 82 stores program instructions 88 and an access server identifier 90. Interfaces 70, switch fabric 74, route processors 76, and interface 80 access memory 86 directly using bus 84 or indirectly using controller 82. Alternatively, information maintained in memory 86 may reside in different components of access server 18 or in components external to access server 18.

Program instructions 88 include software code, parameters, protocols, and other instructions and data structures that controller 82 accesses and executes to generate and communicate a request 104, such as an identification request, to information server 50. Access server identifier 90 comprises any suitable information, such as a management IP address, uniquely identifying access server 18 to the other components of system 10.

Each interface 70 comprises any suitable combination of hardware and software components that terminate virtual circuits 16 in access server 18. In one embodiment, an interface 70 comprises one or more network line cards 92, each network line card 92 having an interface identifier 94. An interface identifier 94 may comprise a module identifier, a slot identifier, a port identifier, or any other suitable information used to identify an interface 70 uniquely within access server 18.

Switch fabric 74 comprises any suitable combination of hardware and software components that directs, couples, and/or switches information communicated by subscribers 12 to a selected route processor 76 and/or controller 82. Switch fabric 74 maintains virtual circuit identifiers 96 reported to it by one or more components of communication network 14. Virtual circuit identifiers 96 may also reside in memory 86. Virtual circuit identifiers 96 comprise any suitable information that uniquely identifies the virtual circuit 16 upon which a particular communication 102 is received from a particular subscriber 12 by access server 18. In one embodiment, a virtual circuit identifier 96 may be defined using the VPI and VCI information for that portion of a particular virtual circuit 16 terminating in the access server 18.

Each route processor 76 comprises any suitable combination of hardware and software components that perform termination, conversion, segmentation, reassembly, addressing, and other functions supported by routers, bridges, gateways, multiplexers, and other WAN and LAN networking devices. Each route processor 76 maintains a routing table 98. Routing table 98 maintains information that allows route processor 76 to route information between communication network 14 using interface 70 and communication network 20 using interface 80 according to communication sessions established by access server 18 in response to identifying subscribers 12. Routing table 98 is described in greater detail with reference to FIG. 4.

Interface 80 comprises any suitable combination of hardware and software components that communicate information received from route processors 76 to communication network 20 using any suitable communication protocols. Controller 82 couples to information server 50 using link 52 and comprises any suitable combination of hardware and software components that execute program instructions 88 to initiate the identification of subscribers 12 in system 10.

In operation, access server 18 receives a communication 102 from subscriber 12 using a particular virtual circuit 16. The virtual circuit identifier 96 for the virtual circuit 16 upon which communication 102 was received is determined by switch fabric 74. Controller 82 receives and examines communication 102 to determine if it contains a request for services. For example, communication 102 may include a request for subscriber information 62 and/or a request for access to communication network 20.

If communication 102 includes a request for services, controller 82 executes program instructions 88 to generate a request 104 for communication to information server 50 to identify the subscriber 12 that sent communication 102. Controller 82 generates request 104 according to any suitable communication protocols used by information server 50, such as TFTP, DHCP or RADIUS protocol. Request 104 includes any appropriately formatted or configured combination of request parameters, such as an appropriate access server identifier 90, interface identifier 94, and virtual circuit identifier 96.

Information server 50 receives request 104 and identifies subscriber 12 based upon path information 60 and the request parameters included in request 104. In particular, information server 50 identifies subscriber 12 if an entry exists in identification table 58 that is indexed by path information 60 corresponding to the request parameters included in request 104. For example, if processor 54 locates an entry in identification table 58 indexed by path information 60 corresponding to the access server identifier 90, the interface identifier 94, and the virtual circuit identifier 96 communicated in request 104, then processor 54 identifies subscriber 12.

Upon identifying subscriber 12, information server 50 and/or access server 18 provide the services requested by subscriber 12 in communication 102. For example, information server 50 and/or access server 18 communicates particular subscriber information 62 to subscriber 12 using, for example, communication network 14. In another example, access server 18 initiates a connection between subscriber 12 and communication network 20, such as by establishing a communication session between subscriber 12 and one or more communication devices associated with communication network 20.

A particular advantage provided by the present invention is that system 10 identifies subscribers 12 based upon "trusted" information to which subscribers 12 cannot readily gain access, such as path information 60, access server identifiers 90, interface identifiers 94, and virtual circuit identifiers 96. In this respect, subscriber 12 cannot access services designated for other subscribers 12 by misappropriating the user name and password of the other subscribers 12. Therefore, the identification techniques of the present invention provide integrity to communication system 10.

FIG. 3 illustrates the contents of identification table 58 stored in memory 56 of information server 50. Each entry of identification table 58 includes path information 60 and subscriber information 62 for each subscriber 12. In particular, path information 60 includes virtual circuit information 110, interface information 112, and access server information 114. In one embodiment, path information 60 further includes user information 116.

Virtual circuit information 110 identifies virtual circuits 16 assigned to subscribers 12. In a particular embodiment, virtual circuit information 110 may include a VPI, a VCI, or any other information that uniquely identifies a virtual circuit 16 assigned to the corresponding subscriber 12. As with virtual circuit identifiers 96, virtual circuit information 110 may be defined using the VPI and VCI information for that portion of an assigned virtual circuit 16 terminating in the access server 18. One particular ATM implementation includes an eight bit VPI and a sixteen bit VCI, as illustrated having two numbers separated by period. Another implementation includes decimal values for VPI and VCI separated by a slash.

Interface information 112 identifies interfaces 70 assigned to subscribers 12 to terminate the virtual circuits 16 identified by corresponding virtual circuit information 110. In a particular embodiment, interface information 112 includes information identifying the slot, module, and port of a network line card 92 of interface 70. Access server information 114 identifies access servers 18 assigned to subscribers 12 to terminate the virtual circuits 16 identified by corresponding virtual circuit information 110.

User information 116 identifies user names and passwords assigned to the corresponding subscribers 12 and/or the users of subscribers 12. For example, user information 116 may identify the user name and password for customer premises equipment associated with subscriber 12. In another example, user information 116 may identify the user name and password for a user of a communication device, such as a computer, coupled to the customer premises equipment of subscriber 12. In this respect, system 10 supports the identification of subscribers 12 and the users of subscribers 12.

Subscriber information 62 comprises address information 118 and configuration information 120 that may be communicated to a corresponding subscriber 12 upon identification. Address information 118 includes a numerical or textual representation of one or more Internet protocol addresses, a network/node designation, netmask attributes, or any other network addresses used by subscriber 12 to communicate with communication network 20. Configuration information 120 includes configuration files, firmware patches, or any other suitable information used to upgrade, monitor, modify, or otherwise operate subscribers 12.

It should be understood that information 110–120 is arranged in separate columns of identification table 58 for illustrative purposes only, and that the contents of information 110–120 may be formatted or configured in any manner suitable for storage and/or communication using the communication protocols of information server 50. For example, identification table 58 may store the contents of information 110–120 according to any suitable format or configuration associated with TFTP, DHCP or RADIUS protocol. If path information 60 is formatted according to a particular communication protocol associated with information server 50, then it should be understood that the information communicated in request 104 may also be formatted in the particular communication protocol to support a consistent and accurate identification of subscribers 12.

Information server 50 identifies a particular subscriber 12 based upon path information 60 and the request parameters communicated by access server 18 in request 104. As described above, request 104 includes a virtual circuit identifier 96 of the particular virtual circuit 16 upon which access server 18 received communication 102. Request 104 further includes an interface identifier 94 indicating the interface 70 terminating the virtual circuit 16 used by the subscriber 12 to send communication 102. Request 104 also includes access server identifier 90 indicating the network address of the access server 18 receiving communication 102 from subscriber 12. Processor 54 identifies the subscriber 12 that sent communication 102 if processor 54 identifies an entry in identification table 58 having virtual circuit information 110, interface information 112, and access server information 114 corresponding to the virtual circuit identifier 96, interface identifier 94, and access server identifier 90, respectively, communicated in request 104.

In one embodiment, request 104 further includes a user name and password sent by subscriber 12 in communication 102. In this embodiment, processor 54 identifies an entry in identification table 58 indexed by user information 116 corresponding to the user name and password provided in request 104. Processor 54 identifies subscriber 12 if the virtual circuit information 110, interface information 112, and access server information 114 associated with the identified user information 116 corresponds to the virtual circuit identifier 96, interface identifier 94, and access server identifier 90 communicated in request 104.

Upon identifying the subscriber 12, access server 18 and/or information server 50 provides the services requested by subscriber 12 in communication 102. For example, access server 18 and/or information server 50 communicates the appropriate address information 118 and/or configuration information 120 to the corresponding subscriber 12 using, for example, communication network 14 or any other suitable link to subscriber 12. In another example, access server 18 initiates the connection between subscriber 12 and communication network 20, such as by establishing a communication session between subscriber 12 and one or more communication devices associated with communication network 20, and by modifying routing table 98 to support the communication session.

FIG. 4 illustrates the contents of routing table 98 associated with route processors 76 of access server 18. Each entry in routing table 98 includes session information 130, address information 132, mapping information 134, address information 136, and routing information 138. Session information 130 is a unique or different designator assigned to each communication session initiated by access server 18 upon identification of a subscriber 12. Address information 132 represents a network address used by the subscriber to connect to communication network 20 during a corresponding communication session. In one embodiment, address information 132 comprises address information 118 issued to subscriber 12 upon identification.

Mapping information 134 includes a VPI, a VCI, identifiers for ports associated with interface 80, or any other information that enables interface 80 to convey information received from route processors 76 to communication network 20. In a particular embodiment, interface 80 includes a switching capability that allows segmentation of communication network 20 for more efficient, modular, and fault tolerant communication. Information 134 may also be used by interface 80 to direct information received from communication devices associated with communication network 20 to a particular route processor 76.

Address information 136 is a numerical or textual representation of an Internet protocol address, a network/node designation, or any other network address used to deliver information to a particular domain, communication device, or any other suitable recipient within communication network 20. Route processor 76 may convert address information 136 for each session into an appropriate format, depending on the particular implementation of access server 18 and communication network 20.

Routing information 138 includes routing information protocol (RIP) information, open-shortest-path-first (OSPF) information, or any other suitable routing information that provides the most efficient, available, or optimum path to communicate information to a particular communication device associated with communication network 20. Routing information 138 identifies particular nodes, paths, or other intermediate devices that establish a desirable route to the appropriate destination communication device within communication network 20.

Upon identification of a subscriber 12 as described with reference to FIGS. 1–3, access server 18 may establish and support a communication session between the identified subscriber 12 and communication network 20. In particular, access server 18 creates an entry for subscriber 12 in routing table 98 having session information 130, address information 132, mapping information 134, address information 136, and routing information 138, and supports the communication session according to information 130–138. Upon the expiration of a communication session (e.g., time out, user termination, equipment malfunction) access server 18 removes the corresponding entry in routing table 98.

Figure 5:
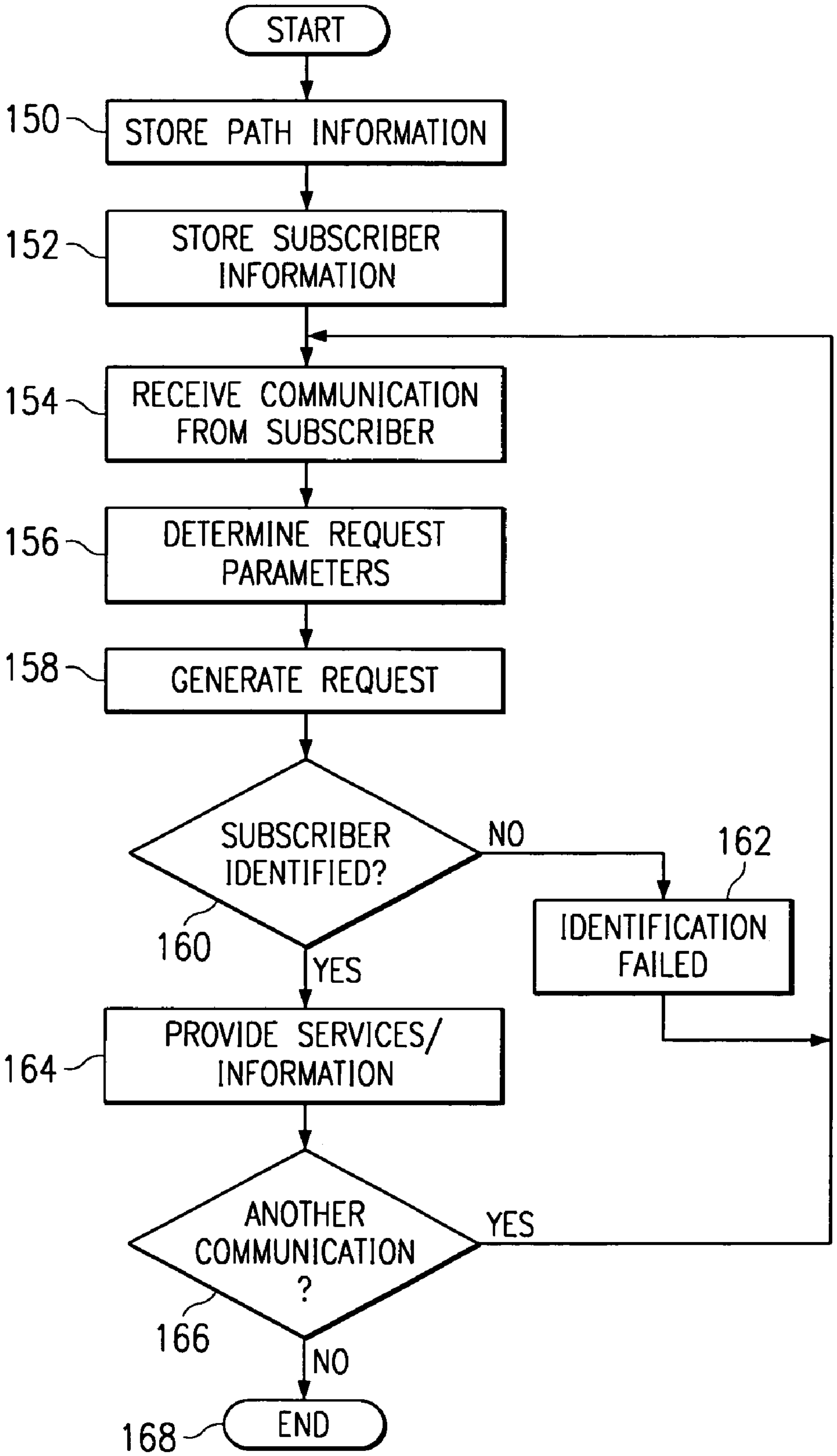
FIG. 5 illustrates a flowchart of an exemplary method according to the present invention.

FIG. 5 illustrates a flowchart of an exemplary method according to the present invention. The method begins at step 150 where information server 50 stores path information 60 in identification table 58. Path information 60 includes virtual circuit information 110, interface information 112, and access server information 114. Execution proceeds to step 152 where information server 50 stores subscriber information 62 indexed by path information 60. Subscriber information 62 includes address information 118 and configuration information 120.

Access server 18 receives communication 102 from a particular subscriber 12 at step 154. Controller 82 of access server 18 determines the appropriate request parameters for communication 102 at step 156, such as the appropriate access server identifier 90, interface identifier 94, and virtual circuit identifier 96. Controller 82 generates and communicates request 104 at step 158. Request 104 generally includes the request parameters determined at step 156.

Processor 54 of information server 50 determines whether the subscriber 12 is identified at step 160. In particular, processor 54 determines whether an entry in identification table 58 includes virtual circuit information 110, interface information 112, and access server information 114 corresponding to virtual circuit identifier 96, interface identifier 94, and access server identifier 90 communicated in request 104. If not, execution proceeds to step 162 where information server 50 and/or access server 18 indicates to subscriber 12 that identification has failed. Execution then proceeds to step 154.

If subscriber 12 is identified as determined at step 160, execution proceeds to step 164 where access server 18 and/or information server 50 provide to subscriber 12 the requested services and/or information. In one example, access server 18 and/or information server 50 may communicate subscriber information 62 to subscriber 12. In another example, access server 18 initiates a communication session between subscriber 12 and communication network 20. Access server 18 determines whether it has received another communication 102 at step 166. If so, execution returns to step 154. If not, execution terminates at step 168.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for identifying a subscriber, comprising:

an access server coupled to a plurality of subscribers using a first communication network and further coupled to a second communication network, the access server operable to receive a communication from a particular subscriber using a particular one of a plurality of virtual circuits associated with the first communication network;

a memory coupled to the access server and operable to store path information for the plurality of subscribers, the path information for the particular subscriber identifying a virtual circuit that is pre-assigned to the particular subscriber for communicating with the access server; and a processor coupled to the memory, the access server comprising one of a plurality of access servers coupled to the processor and the path information for the particular subscriber further identifying an access server assigned to the particular subscriber, the processor operable to:

compare the path information for the particular subscriber to the particular virtual circuit used to receive the communication from the particular subscriber; and identify the particular subscriber for connection to the second communication network based on the comparison and based on an identifier of the particular access server coupled to the particular subscriber.

2. The system of claim 1, wherein the access server comprises:

an interface coupled to the particular subscriber using the particular virtual circuit; and a controller coupled to the interface and operable to communicate a request identifying the particular virtual circuit that couples the interface and the particular subscriber.

3. The system of claim 2, wherein:

the interface comprises a plurality of network line cards;

the path information for the particular subscriber further identifies a network line card assigned to the particular subscriber; and the processor is further operable to identify the particular subscriber based upon the path information for the particular subscriber and an identifier of a particular network line card coupled to the particular subscriber.

4. The system of claim 2, wherein the request comprises:

interface information identifying the interface coupled to the particular subscriber;

virtual circuit information identifying the particular virtual circuit; and access server information identifying the access server.

5. The system of claim 2, wherein the request comprises a RADIUS protocol request.

6. The system of claim 2, wherein the request comprises a trivial file transfer protocol request.

7. The system of claim 1, wherein the particular virtual circuit is associated with the particular subscriber using a virtual path identifier and a virtual channel identifier.

8. The system of claim 1, wherein the path information for the particular subscriber comprises a virtual path identifier and a virtual channel identifier associated with the virtual circuit assigned to the particular subscriber.

9. The system of claim 1, wherein the access server supports a communication session between the particular subscriber and the second communication network in response to identifying the particular subscriber.

10. A method for identifying a subscriber, comprising:

receiving a communication from a particular one of a plurality of subscribers using a particular one of a plurality of virtual circuits associated with a first communication network, the particular virtual circuit coupling the particular subscriber to a particular one of a plurality of access servers;

storing path information for the plurality of subscribers, the path information for the particular subscriber identifying:

a virtual circuit that is pre-assigned to the particular subscriber for communicating with an access server; and an access server assigned to the particular subscriber;

comparing the path information for the particular subscriber to the particular virtual circuit used to receive the communication from the particular subscriber; and identifying the particular subscriber for connection to a second communication network based on the comparison and an identifier of the particular access server coupled to the particular subscriber.

11. The method of claim 10, wherein the particular access server comprises:

an interface coupled to the particular subscriber using the particular virtual circuit; and a controller coupled to the interface.

12. The method of claim 11, wherein:

the interface comprises a plurality of network line cards;

the path information for the particular subscriber further identifies a network line card assigned to the particular subscriber; and the step of identifying further comprises identifying the particular subscriber based upon the path information for the particular subscriber and an identifier of a particular network line card coupled to the particular subscriber.

13. The method of claim 10, wherein the particular virtual circuit is associated with the particular subscriber using a virtual path identifier and a virtual channel identifier.

14. The method of claim 10, wherein the path information for the particular subscriber comprises a virtual path identifier and a virtual channel identifier associated with the virtual circuit assigned to the particular subscriber.

15. The method of claim 10, further comprising supporting a communication session between the particular subscriber and the second communication network in response to identifying the particular subscriber.

16. An information server, comprising:

a memory operable to store path information for a plurality of subscribers coupled to an access server using a plurality of virtual circuits associated with a first communication network, the path information for a particular subscriber in the plurality of subscribers identifying a virtual circuit that is pre-assigned to the particular subscriber for communicating with the access server, the path information for the particular subscriber further identifying an access server assigned to the particular subscriber; and a processor coupled to the memory and operable to:

compare the path information for the particular subscriber to a particular virtual circuit that couples the particular subscriber to the access server; and identify a particular subscriber for connection to a second communication network based on the comparison and an identifier of the access server coupled to the particular subscriber.

17. The information server of claim 16, wherein:

the path information for the particular subscriber further identifies a network line card of the access server assigned to the particular subscriber; and the processor is further operable to identify the particular subscriber based upon the path information for the particular subscriber and an identifier of the network line card.

18. The information server of claim 16, wherein the processor identifies the subscriber in response to receiving a request comprising:

interface information identifying an interface of the access server coupled to the particular subscriber;

virtual circuit information identifying the particular virtual circuit; and access server information identifying the access server.

19. The information server of claim 18, wherein the request comprises a RADIUS protocol request.

20. The information server of claim 18, wherein the request comprises a trivial file transfer protocol request.

21. The information server of claim 16, wherein the virtual circuit that couples the particular subscriber with the access server is associated with the particular subscriber using a virtual path identifier and a virtual channel identifier.

22. The information server of claim 16, wherein the path information for the particular subscriber comprises a virtual path identifier and a virtual channel identifier associated with the virtual circuit assigned to the particular subscriber.

23. A method for identifying a subscriber, comprising:

receiving a request identifying a particular one of a plurality of virtual circuits associated with a first communication network, wherein the particular virtual circuit is used by an access server to receive a communication from a particular one of a plurality of subscribers, the particular virtual circuit coupling the particular subscriber to a particular one of a plurality of access servers;

storing path information for the plurality of subscribers, the path information for the particular subscriber identifying:

a virtual circuit that is pre-assigned to the particular subscriber for communicating with the access server; and an access server assigned to the particular subscriber;

comparing the path information for the particular subscriber to the particular virtual circuit used by the access server to receive the communication from the particular subscriber; and identifying the particular subscriber for connection to a second communication network based on the comparison and an identifier of the particular access server coupled to the particular subscriber.

24. The method of claim 23, wherein the particular access server comprises:

an interface coupled to the particular subscriber using the particular virtual circuit; and a controller coupled to the interface.

25. The method of claim 24, wherein:

the interface comprises a plurality of network line cards;

the path information for the particular subscriber further identifies a network line card assigned to the particular subscriber; and the step of identifying further comprises identifying the particular subscriber based upon the path information for the particular subscriber and an identifier of a particular network line card coupled to the particular subscriber.

26. The method of claim 23, wherein the particular virtual circuit is associated with the particular subscriber using a virtual path identifier and a virtual channel identifier.

27. The method of claim 23, wherein the path information for the particular subscriber comprises a virtual path identifier and a virtual channel identifier associated with the virtual circuit assigned to the particular subscriber.

28. An access server, comprising:

an interface coupled to a plurality of subscribers using a first communication network and operable to receive a communication from a particular subscriber using a particular one of a plurality of virtual circuits associated with the first communication network;

a controller coupled to the interface and operable to communicate a request to an information server for identifying the particular subscriber based on a comparison between path information for the particular subscriber and the particular virtual circuit used to receive the communication from the particular subscriber, the request comprising:

interface information identifying the interface coupled to the particular subscriber;

virtual circuit information identifying the particular virtual circuit; and access server information identifying the access server;

the path information for the particular subscriber identifying a virtual circuit that is pre-assigned to the particular subscriber for communicating with the access server, the request identifying the particular virtual circuit used to receive the communication from the particular subscriber; and a route processor coupled to the controller and operable to support a communication session between the particular subscriber and a second communication network in response to identifying the particular subscriber based on the comparison.

29. The access server of claim 28, wherein the request comprises a RADIUS protocol request.

30. The access server of claim 28, wherein the request comprises a trivial file transfer protocol request.

31. A method for identifying a subscriber, comprising:

receiving a communication from a particular one of a plurality of subscribers using a particular one of a plurality of virtual circuits associated with a first communication network;

communicating a request to an information server for identifying the particular subscriber based on a comparison between path information for the particular subscriber and the particular virtual circuit used to receive the communication from the particular subscriber, the request comprising:

interface information identifying an interface of an access server coupled to the particular subscriber;

virtual circuit information identifying the particular virtual circuit; and access server information identifying the access server;

the path information for the particular subscriber identifying a virtual circuit that is pre-assigned to the particular subscriber for communicating with the access server, the request identifying the particular virtual circuit used to receive the communication from the particular subscriber; and supporting a communication session between the particular subscriber and a second communication network in response to identifying the particular subscriber based on the comparison.

32. The method of claim 31, wherein the request comprises a RADIUS protocol request.

33. The method of claim 31, wherein the request comprises a trivial file transfer protocol request.

34. A computer program for identifying a subscriber, the program encoded on a computer-readable medium and operable to execute the following steps:

receiving a communication from a particular one of a plurality of subscribers using a particular one of a plurality of virtual circuits associated with a first communication network, the particular virtual circuit coupling the particular subscriber to a particular one of a plurality of access servers;

storing path information for the plurality of subscribers, the path information for the particular subscriber identifying:

a virtual circuit that is pre-assigned to the particular subscriber for communicating with an access server; and an access server assigned to the particular subscriber;

comparing the path information for the particular subscriber to the particular virtual circuit used to receive the communication from the particular subscriber; and identifying the particular subscriber for connection to a second communication network based on the comparison and an identifier of the particular access server coupled to the particular subscriber.

35. The computer program of claim 34, wherein the particular access server comprises:

an interface coupled to the particular subscriber using the particular virtual circuit; and a controller coupled to the interface.

36. The computer program of claim 35, wherein:

the interface comprises a plurality of network line cards;

the path information for the particular subscriber further identifies a network line card assigned to the particular subscriber; and the step of identifying further comprises identifying the particular subscriber based upon the path information for the particular subscriber and an identifier of a particular network line card coupled to the particular subscriber.

37. The computer program of claim 34, wherein the particular virtual circuit is associated with the particular subscriber using a virtual path identifier and a virtual channel identifier.

38. The computer program of claim 34, wherein the path information for the particular subscriber comprises a virtual path identifier and a virtual channel identifier associated with the virtual circuit assigned to the particular subscriber.

39. The computer program of claim 34, further comprising supporting a communication session between the particular subscriber and the second communication network in response to identifying the particular subscriber.

* * * * *